UNITED STATES PATENT OFFICE.

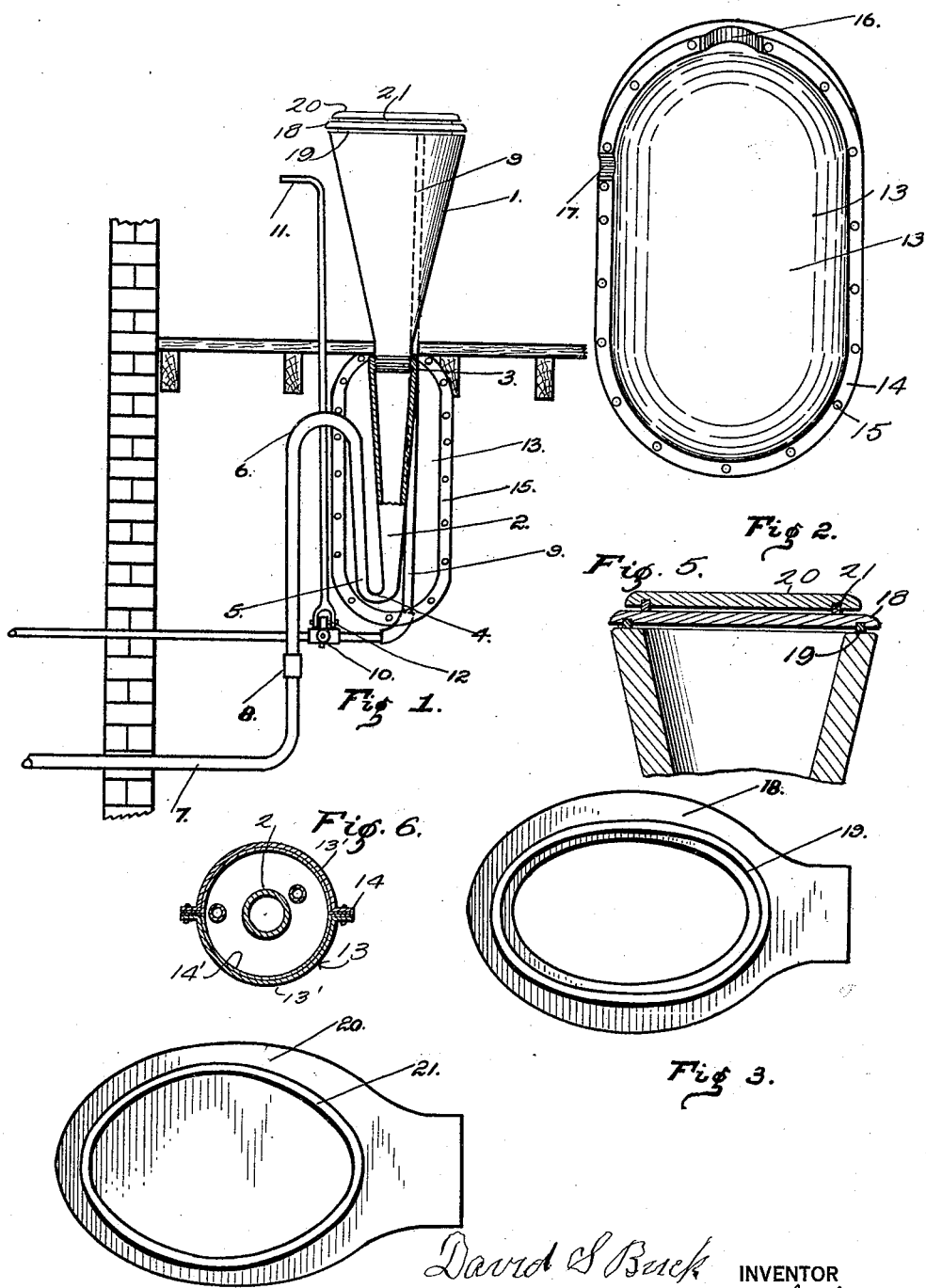

DAVID S. BUCK, OF PUEBLO, COLORADO.

TOILET.

1,399,927.  Specification of Letters Patent.  Patented Dec. 13, 1921.

Application filed June 15, 1920. Serial No. 389,215.

*To all whom it may concern:*

Be it known that I, DAVID S. BUCK, a citizen of the United States, residing at Pueblo, in the county of Pueblo and State of Colorado, have invented certain new and useful Improvements in Toilets, of which the following is a specification.

My invention relates to improvements in toilets.

Important objects of the invention are to provide means whereby the arms of the water seal are long for preventing the escape of sewer gas; heat insulating means for inclosing the trap and goose neck of the water seal whereby the water will not freeze in cold weather, and the seal will be free to properly operate at all times; means whereby access may be readily had to the interior of the trap to clean the same; means whereby the water from the main may be supplied directly to the upper portion of the bowl to flush the same; means for effecting a gas tight joint between the seat and bowl and between the cover and seat.

Other objects and advantages of the invention will be apparent during the course of the following description.

In the accompanying drawings forming a part of this specification and in which like numerals are employed to designate like parts throughout the same, Figure 1 is a perspective view of apparatus embodying my invention, Fig. 2 is a side elvation of one section of the insulating casing, Fig. 3 is a bottom plan view of the seat, Fig. 4 is a similar view of the cover, Fig. 5 is a fragmentary vertical section through the bowl and associated elements, and Fig. 6 is a horizontal section through the insulating casing and associated elements.

In the drawings, the numeral 1 designates a toilet bowl, which is preferably conical and tapered downwardly. This bowl may be formed of metal and porcelain lined, interiorly and exteriorly. This bowl is substantially elongated, and is connected at its lower end with a vertical elongated trap 2, by screw-threads 3. This trap is conical and taperes downwardly, and is preferably lined interiorly with porcelain. The trap 2 is provided at its lower end with a contracted horizontal throat 4, which is slightly enlarged or widened, immediately beyond the point 5, and continues in the form of a gooseneck 6. This gooseneck extends upwardly sufficiently to insure a water seal or column of 8 or 9 inches at all times. The outer arm of this gooseneck extends downwardly and is connected to the main line 7 by a sleeve 8, the main line extending to the sewer.

The toilet is flushed by water passing through the pipe 9, which leads into the upper end of the bowl 1. A valve 10 is connected in the pipe 9, at a suitable point, and is opened and closed by a turn-rod 11, connected with the valve, as at 12.

The numeral 13 designates a protecting or heat insulating drum, preferably made of metal, and preferably formed in two substantially elliptical sections 13'. These drum sections have their contacting edges provided with flanges 14, apertured for receiving bolts 15 which connect them. The drum sections 13' are lined with sections of insulating material 14' preferably formed of asbestos, and the edges of these linings extend over the flanges 14, thereby effecting an air tight joint. The drum sections 13' have recesses or openings 16, which receive the upper end of the trap 2. The drum sections 13' also have recesses 17, lined with the asbestos lining 14', and receiving the upper portion of the gooseneck 6, and effecting the air tight joint therewith. It is thus seen that the drum completely incloses the trap and the inner arm of the gooseneck and hence the entire water seal, whereby the water is prevented from freezing in cold weather, and these parts are also protected from injury. The drum sections 13' being readily separable, access may be had to the trap 2 and associated elements, when desired.

The numeral 18 designates a seat, which may be connected with the upper end of the bowl, such as pivoted thereto, by any suitable means. This seat is provided upon its lower face with a rubber packing element 19 adapted to contact with the top of the bowl 1, and form a gas tight joint therewith. The numeral 20 designates a cover which may be hinged to the top of the bowl 1, and provided upon its lower face with a rubber packing element 21, to contact with the seat, and form a gas tight joint therewith.

I wish to call particular attention to the fact that material which will not clog at the throat of the trap will not clog at any other point in the apparatus on the way to the sewer.

In view of the foregoing description it is thought that no further explanation of the device is necessary.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. In apparatus of the character described, a bowl, a substantially vertical trap member connected with the lower end of the bowl, a gooseneck connected with the lower end of the trap member and having substantially vertical inner and outer arms, elongated substantially vertical heat insulating drum sections provided at their inner edges with flanges, said flanges being provided at their upper end with openings to receive the upper end of the trap member, the bowl being disposed exteriorly of the drum sections, said flanges being provided upon one side and near their upper ends with openings to receive the transverse portion of the gooseneck, the inner substantially vertical arm of the gooseneck being positioned within the drum sections, means for detachably securing the flanges together, and means to supply water to the bowl.

2. In apparatus of the character described, a bowl, a substantially vertical trap member connected with the lower end of the bowl, a gooseneck connected with the lower end of the trap member, a two part heat insulating drum inclosing the trap member and the inner arm of the gooseneck, means for detachably securing the parts of the drum together, and means to supply water to the bowl.

3. In apparatus of the character described, a bowl, a trap member connected with the lower end of the bowl, a gooseneck connected with the lower end of the trap member, drum sections provided at their contacting edges with flanges, said flanges having recesses for the reception of the trap member and gooseneck, means for detachably connecting the flanges, heat insulating linings for the drum sections, and means to supply water to the bowl.

In testimony whereof I affix my signature in presence of two witnesses.

DAVID S. BUCK.

Witnesses:
WILLIAM B. VATES,
Z. H. NELSON.